United States Patent [19]

Eugster et al.

[11] Patent Number: 5,357,848
[45] Date of Patent: Oct. 25, 1994

[54] COFFEE MACHINE

[75] Inventors: Arthur Eugster; Daniel Fischer, both of Romanshorn, Switzerland

[73] Assignee: Arthur Eugster AG, Romanshorn, Switzerland

[21] Appl. No.: 102,689

[22] Filed: Aug. 5, 1993

[51] Int. Cl.⁵ .......................................... A47J 31/30
[52] U.S. Cl. ...................................... 99/279; 99/293
[58] Field of Search ............... 99/293, 294, 307, 300, 99/302 R, 281, 295, 279, 302 P; 426/433

[56] References Cited

U.S. PATENT DOCUMENTS

| | | | |
|---|---|---|---|
| 3,711,681 | 1/1973 | Leuschner | 99/307 |
| 4,565,121 | 1/1986 | Ohya | 99/293 |
| 4,757,753 | 7/1988 | Pandolfi | 99/293 |
| 4,778,977 | 10/1988 | Bleckman | 99/307 |
| 4,947,738 | 8/1990 | Eugster | 99/293 |

*Primary Examiner*—Robert W. Jenkins
*Attorney, Agent, or Firm*—Darby & Darby

[57] ABSTRACT

A coffee machine comprises a fresh water reservoir. A heating block, having a first flow heater pipe, is in fluid communication with the reservoir via a first connection line and a second connection line. The first connection line has a check valve disposed therein, the second connection line has a pump disposed therein. A coffee-making head is in fluid communication with the heating block via a pipe. The pipe ascends from the heating block to the coffee-making head. A steam nozzle is in fluid communication with the heating block via a steam line. A device fluidly connects the reservoir with the steam outlet when the pump is operating.

10 Claims, 2 Drawing Sheets

COFFEE MACHINE

BACKGROUND OF THE INVENTION

The present invention relates to a coffee machine in which hot water for a coffee-brewing process is produced in a normally electrically heated flow heater which communicates with a fresh-water reservoir via a water-carrying line and which is provided with a check valve. The flow heater is positioned at a level below the lowermost point of the fresh-water reservoir, and the check valve is open towards the flow heater so that the flow heater will fill automatically due to the force of gravity of the water. The outlet of the flow heater is connected to an ascending pipe terminating in a coffee-making head from which brewing water can pour into a filter receptacle. As soon as the water begins to boil in the flow heater, pressure will build up in said flow heater, which will close the check valve and eject the boiling water from the coffee-making head. After the water has been ejected, the flow heater can refill with fresh water and the cycle starts again.

Such coffee machines offer no possibility of producing, alternatively to brewing water, also hot steam for the purpose of heating or foaming up, e.g., milk, as would be necessary for making cappuccino. For producing cappuccino, an espresso machine is normally used, such an espresso machine being however, comparatively expensive in comparison with a conventional coffee machine because of the high-pressure pump which has to be used. Moreover, for making cappuccino, it is not necessary to use espresso, but it will suffice to add normal coffee to the hot milk. Some cappuccino drinkers even prefer filtered coffee to espresso, which tastes slightly bitter. Hence, for making this type of cappuccino, a normal filter-coffee machine and an espresso machine are required unless the milk is heated on a separate kitchen stove or in a microwave oven.

It is the object of the present invention to provide a coffee machine by means of which cappuccino can be made as well.

SUMMARY OF THE INVENTION

The present coffee machine offers the possibility of selectively producing in a simple manner either brewing water for brewing coffee or steam for heating and foaming up milk. With the pump which is only intended for steam generation, it is possible in a simple way to exactly dose the water passage, as is required for steam generation. The dosage is chosen such that, at a given heating power, dry steam is obtained at a constant flow rate. If the flow rate is chosen too high, the steam is excessively saturated and the beverage heated with steam will unnecessarily be diluted. With a dosage that is too small, there may be an unpleasant noise generation within the flow heater because ingressing water is abruptly vaporized. Furthermore, there is the risk that the flow heater is partly overheated. Between these two extreme cases, there is a relatively broad scope which makes dosage uncritical. In contrast to espresso machines where it is already known that a pump which is present at any rate is used at a reduced delivery rate for steam generation, the pump which is to be provided in the present case may be of a much more simple and inexpensive structure because it need not generate any noteworthy pressure and just serves dosage purposes.

In the embodiments of the present invention, there are different means for connecting the flow heater to the steam outlet during pump operation. In one embodiment the flow heater is provided with a separate flow pipe for steam formation, the flow pipe communicating with the pump at the inlet side and with the steam outlet at the outlet side. A two-way valve which selectively releases water supply to the one or the other flow pipe is positioned between the fresh-water reservoir and the two flow pipes. In another embodiment, the flow path of the flow heater is jointly used for hot-water formation and steam generation. A two-way valve by means of which the outlet of the low heater is selectively connectable to the coffee-making head or the steam outlet is provided at the outlet end of the flow heater. This embodiment is of a specifically simple type because the flow heater need only be provided with one flow pipe that is used for both hot-water preparation and steam generation. The check valve which effects intermittent filling of the flow heater during coffee preparation, is automatically blocked by the pressure exerted by the pump during steam operation, i.e., during operation in which the pump is activated, so that additional means need not be provided for preventing steam from flowing back into the fresh-water reservoir.

BRIEF DESCRIPTION OF THE DRAWINGS

The invention will be explained in detail hereinbelow on the basis of the embodiments shown in the drawing, wherein.

DETAILED DESCRIPTION OF THE INVENTION

Figure 1:
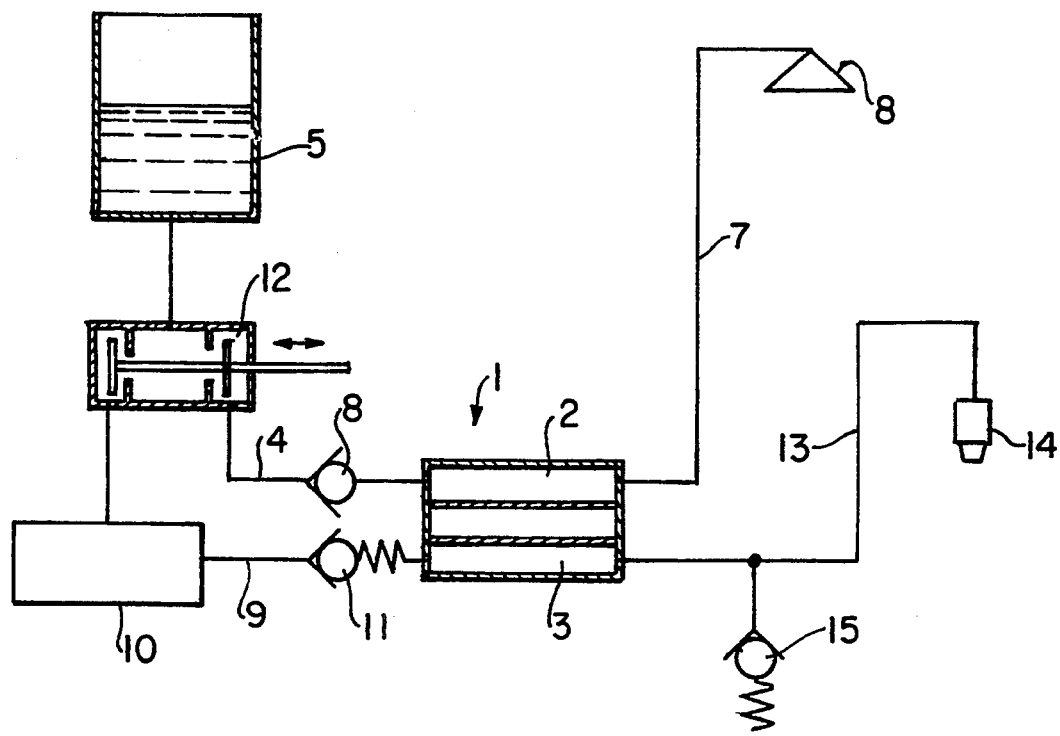
FIG. 1 is an embodiment with a flow heater having two flow pipes.
Figure 2A:
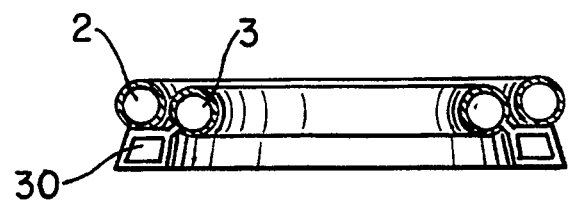
FIG. 2 is an embodiment with a flow heater having only one flow pipe.
Figure 2B:
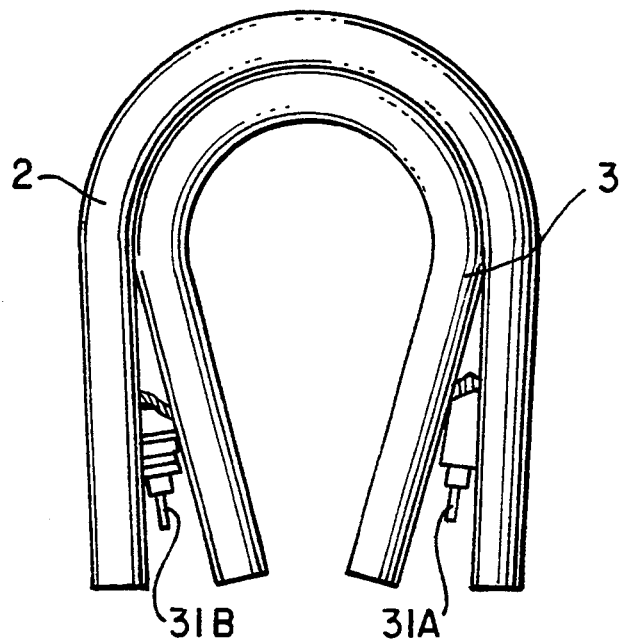

FIGS. 1 and 2 diagrammatically show the structural design of the coffee machine. In the embodiment shown in FIG. 1, two flow heater pipes 2 and 3 are arranged in a heating block 1. The inlet of the flow pipe 2 communicates with a fresh-water reservoir 5 via a water-carrying line 4. The line 4 has provided therein a check valve 6. The outlet of the flow pipe 2 is connected to an ascending pipe 7 terminating in a coffee-making head 8.

The first flow pipe 3 is also connected to the fresh-water reservoir at the inlet side. A pump 10 and a pressure valve 11 are provided in the connection line 9. Both lines 4 and 9 are alternatively supplied with fresh water by a two-way valve 12. The outlet of the flow pipe 3 communicates with a steam nozzle 14 via a steam line 13. The steam line 13 is provided with a safety valve 15, which only serves to discharge the steam produced in case the steam nozzle 14 is blocked. The pressure valve 11 is not needed when the pump itself is constructed such that it will prevent water or steam from flowing back.

Figure 3:
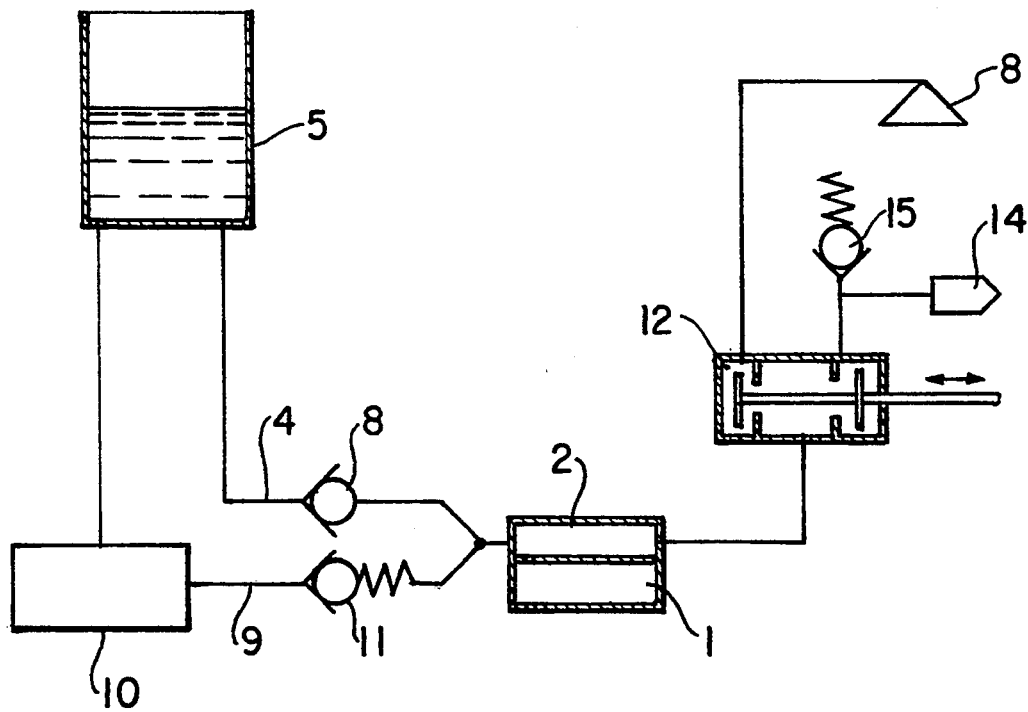
FIG. 3 shows the flow heater according to the embodiment of FIG. 1.

FIG. 3 shows the heating block 1 of FIG. 1, i.e., in cross section and top view. Heating block 1 contains a basic body 30 in which an electric resistance wire is arranged in a ceramic mass. The two electric terminals 31A and 31B are positioned at the ends. A first flow pipe 3 which is connected to the basic body 30 via a web 32 which is integral with this basic body 30. A second flow pipe 2 which is soldered to the basic body 30 is in parallel with the first flow pipe 3. The basic body 30 and the two passage pipes 2, 3 are made of metal.

In the following, the mode of operation of the coffee machine according to FIG. 1 will be explained in detail. When coffee is to be brewed, the two-way valve 12 is moved to a position in which the flow pipe 2 can fill with water. As soon as the water begins to boil in said flow pipe 2, the check valve 6 will be closed by the pressure building up, and the brewing water will be ejected from the coffee-making head 8. This will have the effect that the pressure in the flow pipe 2 drops and said flow pipe can refill with water via the check valve 6, whereupon the next brewing cycle can be started. If steam is required for foaming up milk, the two-way valve 12 will be moved to the other position and the pump 10 will be activated simultaneously. In the course of this process, the flow pipe 2 is separated from the fresh-water reservoir 5 and, consequently, it is inactive. The pump 10 now supplies to the flow pipe 3 an amount of fresh water which is so small that the water will boil in the flow pipe 3 and dry steam will be ejected from the steam nozzle 14. As soon as the pump 6 has been switched off, the formation of steam is interrupted and the production of brewing water can be resumed at any time.

The embodiment according to FIG. 3 differs from that of FIG. 1 only by the feature the heating block just includes one flow pipe 2 which is jointly used for the brewing water and the steam generation. The two-way valve 12 is arranged at the outlet end of the heating block in this embodiment and clears the way to either the coffee-making head 8 or the steam outlet 14. Upon activation of the pump 10 and the corresponding adjustment of the two-way valve 12, a dosed amount of water is released into the flow pipe 2, it is vaporized there and discharged from the steam outlet 14. As a result of the pressure build-up via pump 10, the check valve 6 is automatically closed, thereby preventing fresh water from simultaneously passing via line 4 into the flow pipe 2.

Of course, pump 10 may be force-coupled with the two-way valve 12 to ensure that the two-way valve 12 is brought into the respectively correct position together with the activation and deactivation of the pump.

There is also the possibility of dividing the fresh-water reservoir 5 into two separate containers so as to take the water for the steam generation from the one receptacle and the water for the brewing water from the other receptacle only. This may have the effect that even if the receptacle for the brewing water has entirely been emptied, a sufficient amount of water is still present for the subsequent steam formation and the receptacle need not be filled again.

We claim:

1. A coffee machine comprising:

a fresh water reservoir;

a heating block having at least a first flow heater pipe, said heating block being in fluid communication with said reservoir via a first connection line and a second connection line, said first connection line having a check valve disposed therein, said second connection line having a pump disposed therein;

a coffee-making head being in fluid communication with said heating block via a pipe, said pipe ascending from said heating block to said coffee-making head;

a steam nozzle being in fluid communication with said heating block via a steam line; and means for fluidly connecting said reservoir with said steam outlet when said pump is operating.

2. A coffee machine according to claim 1, wherein said heating block has a second flow heater pipe for steam generation, and second flow heater pipe having an inlet side and an outlet side, said second flow heater pipe communicating with said pump at the inlet side and with said steam nozzle at the outlet side, said fluid connecting means selectively permits fluid communication from the reservoir to one of said first and second flow pipes, said fluid connecting means being disposed between said fresh-water reservoir and said first and second flow heater pipes.

3. A coffee machine according to claim 2, wherein, a pressure valve is disposed in the second connection line between said pump and said heating block.

4. A coffee machine according to claim 2, wherein, a safety valve is disposed in the steam line between said heating block and said steam nozzle.

5. A coffee machine according to claim 1, wherein said fluid connecting means comprises a two-way valve, with the aid of which said two-way valve selectively connects an outlet of said heating block with said coffee-making head and steam nozzle, said two-way valve being disposed at the outlet of said heating block.

6. A coffee machine according to claim 5, wherein, a pressure valve is disposed in the second connection line between said pump and said heating block.

7. A coffee machine according to claim 5, wherein a safety valve is disposed in the steam line between said heating block and said steam nozzle.

8. A coffee machine according to claim 1, wherein, a pressure valve is disposed in the second connection line between said pump and said heating block.

9. A coffee machine according to claim 8 wherein, a safety valve is disposed in the steam line between said heating block and said steam nozzle.

10. A coffee machine according to claim 1 wherein, a safety valve is disposed in the steam line between said heating block and said steam nozzle.

* * * * *